United States Patent [19]

Perini

[11] 3,928,630
[45] Dec. 23, 1975

[54] ENZYMATIC PROCESSES FOR HYDROLYZING PROTEINS

[75] Inventor: Fulvio Perini, Palo Alto, Calif.

[73] Assignee: Syntex (U.S.A.) Inc., Palo Alto, Calif.

[22] Filed: May 24, 1974

[21] Appl. No.: 473,255

[52] U.S. Cl. .................. 426/7; 426/32; 426/56; 426/59; 195/29
[51] Int. Cl.² .......................................... C12B 1/00
[58] Field of Search .......... 195/4, 5, 29, 118; 426/7, 426/52, 55, 56, 364, 32, 59; 260/112 R

[56] References Cited
UNITED STATES PATENTS

| | | | |
|---|---|---|---|
| 2,456,297 | 12/1948 | Melnick | 195/29 |
| 2,590,517 | 3/1952 | Drangsholt | 195/29 |
| 3,598,606 | 8/1971 | Spinelli | 260/112 R |
| 3,697,285 | 10/1972 | Faith et al. | 426/7 |

*Primary Examiner*—A. Louis Monacell
*Assistant Examiner*—R. B. Penland
*Attorney, Agent, or Firm*—Alan M. Krubiner; Larry S. Squires; William B. Walker

[57] ABSTRACT

Improved enzymatic processes for hydrolyzing proteins. The processes are characterized by the use of calcium hydroxide to control pH during hydrolyses, then followed by neutralization, upon completion of the hydrolysis, by the addition of phosphoric acid to yield a calcium phosphate precipitate. This precipitate serves as a filter aid during filtration of the product suspension, improving filtration and affording a more palatable protein hydrolysate product.

12 Claims, No Drawings

ENZYMATIC PROCESSES FOR HYDROLYZING PROTEINS

BACKGROUND OF THE INVENTION

1. The Invention

This invention relates to processes for hydrolyzing proteins into protein hydrolysates. In a further aspect this invention relates to improved enzymatic processes for preparing protein hydrolysates, having improved palatability. In another aspect this invention relates to an enzymatic process for preparing protein hydrolysates which facilitates product purification. In a still further aspect this invention relates to alkali active enzyme processes for hydrolyzing protein in which basic conditions are maintained during the hydrolysis by the controlled addition of calcium hydroxide and wherein upon completion of the hydrolysis, the reaction mixture is neutralized by the addition of phosphoric acid to yield a calcium phosphate precipitate.

2. The Prior Art

The prior art has developed many processes for converting aesthetically undesirable proteins, such as fish protein concentrate, slaughterhouse animal wastes, animal blood, into nutritionally usable products, note for example, the processes described in U.S. Pat. Nos. 2,098,923, 2,180,637, 2,958,630, 3,697,285 and 3,761,353. One of the most successful of the prior art processes is the enzymatic hydrolysis process wherein a protein source is treated with a proteolytic enzyme complex (e.g. pancreatin) to yield a nutritionally useful protein hydrolysate (predominantly a mixture of amino acids and peptides). I have now discovered a method for improving the proteolytic enzyme process whereby product recovery and purification process time and cost are reduced and whereby a more palatable product is obtained and whereby a recyclible or commercially usable by-product waste residue can also be obtained.

SUMMARY OF THE INVENTION

In summary, the process of our invention comprises treating a protein substrate with an alkali proteolytic enzyme complex such as pancreatin, and maintaining alkaline conditions during the hydrolysis with/by addition of calcium hydroxide and upon completion of the hydrolysis adjusting the reaction mixture to a pH of about 7, by the addition of phosphoric acid to precipitate a mixture of mono- and dibasic calcium phosphate. The reaction mixture is then easily filtered with the calcium phosphate precipitate serving as a deflavoring and decolorizing filter aid, thereby affording a filtrate of improved purity.

DETAILED DESCRIPTION OF THE INVENTION AND PREFERRED EMBODIMENTS

In accordance with the practice of the invention, an insoluble non-functional protein substrate, suspended in a liquid medium, typically water, is treated with an alkaline active proteolytic enzyme to yield a soluble protein hydrolysate predominantly containing soluble peptides and minor quantities of soluble amino acids, and a residue of insoluble proteins or peptides, carbohydrates, and mineral impurities. Typically, this treatment is conducted at temperatures in the range of about from 35° to 60°C and preferably about from 40° to 50°C for about from 12 to 24 hours. The pH of the reaction mixture is controlled during the treatment by the addition of calcium hydroxide to maintain a pH in the range of about from 7.2 to 8.0 and preferably about 7.5 as the activity of the enzyme is dependent upon this pH range. Whereas in the prior art processes the pH has been maintained by the controlled addition of any suitable base, typically ammonium hydroxide or sodium hydroxide, it is necessary in order to practice the present invention to use calcium hydroxide as the base. Also as the initial substrate is typically slightly acid or neutral, it is desirable to increase the pH of the initial substrate liquid medium mixture to about from 7.5 to 9.5 by the addition of calcium hydroxide. Although the enzyme functions most effectively below pH 8 (e.g. about pH 7.5) the excess alkalinity is quickly consumed by the acid generating character of the hydrolysis and, in fact, the excess alkalinity provides a slight grace period in controlling the pH within the prescribed range during the hydrolysis. It is also preferable to conduct the treatment using a biostatic agent such as, for example, chloroform or toluene or mixtures of chloroform or toluene. Any proteolytic enzyme which causes the hydrolysis of proteins into peptides and/or amino acids, under alkaline conditions can be used. Typically, a mixture of enzymes obtained from the pancreas of cattle or hogs, commonly referred to as pancreatin, is used as it yields good results and is readily commercially available and relatively inexpensive. Also isolated proteolytic enzymes such as trypsin, chymotrypsin, carboxypeptidases A and B, collagenase and compatible mixtures thereof, and the like, can also be used. Suitable protein sources which can be used include insoluble non-functional fish protein concentrate, fish meals, slaughterhouse animal wastes, and animal blood. The processes are particularly useful with respect to fish protein concentrate substrates and animal blood substrates. The quantity of enzyme used will vary with the reaction conditions and the particular protein substrate used, but typically will be in the range of about from 0.5 to 3 grams per 100 grams of protein substrate.

After the desired hydrolysis is completed, the pH of the reaction is brought down to a pH of about 7 by the addition of phosphoric acid. This results in the formation of a precipitate of calcium phosphate, typically a mixture of monobasic calcium phosphate ($CaHPO_4$) and dibasic calcium phosphate $Ca(H_2PO_4)_2$. The reaction mixture is next filtered using the precipitated calcium phosphate as the sole filter aid, thus avoiding the need for an external filter aid. I have further found that as compared with the process of the prior art, for example, using ammonium hydroxide or sodium hydroxide as the pH controlling base, and wherein an external filter aid, such as diatomaceous earth, is used, that the process of the invention yields a purer filtrate and reduces the time required for filtration. Further, as the calcium phosphate precipitate is a nutritionally acceptable material, the filter cake can be used directly as an animal feed supplement or recycled, whereas the filter cakes obtained using external filter aids must be subjected to additional treatments to remove the filter aid in order to be acceptable for animal consumption. Although the reason that the present process affords a purer product than the prior art processes using external filter aid is not clearly understood, it is conjectured that undesirable flavor agents and some color agents may be occluded within the precipitate during its formation and/or that the calcium phosphate precipitate has molecular sieve properties which are capable of absorbing the flavor agents and some coloring agents. The process of the invention also facilitates the removal of undesirable metallic impurities such as mercury in the case of fish proteins and iron in the case of animal proteins, and also fluorides. The iron impurities and fluoride ions are respectively precipitated as iron phosphate and calcium fluoride and removed with the calcium phosphate precipitate. The mercury contaminants are also unexpectantly removed with the calcium phosphate precipitate either as insoluble salts or by absorption or inclusion within the calcium phosphate precipitate. Where unacceptable quantities of toxic components are recovered with the calcium phosphate precipitate, the resulting filter cake cannot, of course, be directly used as an animal feed supplement.

If desired, the resulting product filtrates, which are rich in protein hydrolysate such as peptide and amino acids can be filtered through or mixed with particulate activated charcoal then filtered, to remove any remaining color impurities. The protein hydrolysate can then be recovered as an essentially white powder from the filtrate by conventional procedures such as, for example, evaporation, freeze drying, spray drying, etc. The resulting product is readily soluble in water forming a virtually flavorless and colorless solution as compared with the prior art products which typically contain undesirable flavors and/or colors, characteristic of the particular protein substrate used — e.g. fish flavor, or blood flavor and/or color. Accordingly the product produced by the invention can be conveniently used as a protein supplement in palatable solution for oral use, or as a protein supplement in beverages such as fruit juices, carbonated soft drinks, beers, etc., and also typical foods such as soups, fortified breakfast products and the like. Secondarily the product can also be used as an amimal feed supplement and can be conveniently sprayed, in solution form, on the desired animal feed or meal, e.g. swine feeds, ruminant feeds, equine feeds, poultry feeds and the like.

A further understanding of the invention can be had from the following non-limiting examples.

EXAMPLE 1

In this example 1.5 g. of pancreatin 4 × N.F. (National Formulary — standard nomenclature) is added to an aqueous suspension containing 50 g. of fish protein concentrate in 500 ml of water. The pH of the resulting mixture is adjusted to 8.0 by the addition of an aqueous suspension of calcium hydroxide — about 8 g. of calcium hydroxide is required. The mixture is agitated for 22 hours at 40°C. During this time the pH of the aqueous medium is continually monitored and the calcium hydroxide added as required to maintain the pH at 8. The pH of the mixture is then adjusted to 7 by the addition of concentrated phosphoric acid, about 0.5 cc., resulting in the formation of a gel-like precipitate of calcium phosphate. The mixture is then filtered through a filter paper funnel. Ten grams of activated charcoal powder (Darco KB) is then added to the filtrate, which is then filtered, then freeze dried affording a white crystalline powder having a slight yellow tinge. A 2.5%, by wt., aqueous solution of protein hydrolysate is then prepared and found to form a clear, virtually colorless solution having little or no discernible taste.

The above procedure is then repeated but in this instance ammonium hydroxide is used in place of calcium hydroxide to regulate the pH. In this instance, a filter aid (i.e. diatomaceous earth) is used in the first filtration step. The final protein hydrolysate product is a virtually white crystalline powder. A 2.5%, by wt., aqueous solution of this protein hydrolysate product is clear but slightly yellow in color and has a slightly bitter taste.

EXAMPLE 2

This example illustrates the process of the invention on a scaled-up commercial size operation and further illustrates the improvement in filtration rate obtained by the present process as compared to a corresponding prior art process using a conventionally added filter aid. In this example 462 lbs. of fish protein concentrate is admixed to 4600 lbs. of deionized water at a temperature of about 113°F. The pH of the mixture is adjusted to about pH 8.5 ± 0.2 by the controlled addition of calcium hydroxide, about 5 lbs. is required. Four pints of toluene and four pints of chloroform are then added to the mixture as biostatic agents and the resulting mixture is heated to about 110°F, then 13.9 lbs. of pancreatin 4 × N.F. (National Formulary XII — monograph 287) is added. Upon digestion of the fish protein concentrate, the pH of the reaction mixture decreases and is controlled at about 7.7 ± 0.3 by the addition of calcium hydroxide at half hour intervals for approximately four to five hours. About 15 to 20 lbs. of calcium hydroxide is required. The digestion is allowed to continue for an additional 14–15 hours, at the end of which time the pH has dropped to about 7.4 ± 0.2. The pH is then adjusted to 7.0 ± 0.1 by the addition of 85 percent, by wt., aqueous phosphoric acid. The reaction mixture is then heated to 143°F for 30 minutes to deactivate the pancreatin enzyme complex and is then pumped through a filter press at the rate of 25 to 40 gal. per minute using only the basic calcium phosphate precipitate formed after the addition of the phosphoric acid as the filter aid. The filtrate is recovered and admixed with 60 lbs. of powdered activated charcoal and mixed for 30 minutes and then filtered to remove the charcoal. The charcoal filter cake is washed with 100 gal. of hot water (about 150°F) and combined with the filtrate. The combined filtrate and washing is heated and condensed by evaporation to solids content of approximately 10 percent. The concentrate is cooled to 40°F and then spray dried affording approximately 260 lbs. of protein hydrolysate as a substantially white powder. A sample of the product is then dissolved in water forming an essentially colorless clear solution having no discernible taste.

The above procedure is then repeated but using ammonium hydroxide in place of calcium hydroxide and using about 260 lbs. of diatomaceous earth as a filter aid during the initial filtration process. In this case the maximum filtration rate which can be obtained is 5 gal. per minute and a sample of the resulting product forms an aqueous solution having a discernible yellow tinge and a brackish or off-taste.

Obviously many modifications and variations of the invention, described herein above and below in the Claims, can be made without departing from the essence and scope thereof.

What is claimed is:

1. A process of enzymatically hydrolyzing insoluble non-functioning protein, derived from a fish or animal source, comprising the steps of:

a. forming a liquid suspension of said protein:

b. adjusting the pH of said suspension to about from 7.5 to 9.5, by the addition of calcium hydroxide;

c. contacting said protein with an alkaline active protein proteolytic enzyme and maintaining temperature of said suspension in the range of about from 35° to 60°C and maintaining the pH in the range of about from 7.2 – 8, for 12 to 24 hours, by the addition of calcium hydroxide, thereby hydrolyzing said protein;

d. adjusting the pH of the suspension to about 7.0 by addition of phosphoric acid to form a particulate precipitate of calcium phosphate; and e. filtering the product mixture of step (d), using the calcium phosphate precipitate formed in step (d) as a filter aid thereby yielding a clear, virtually colorless and tasteless hydrolysate rich filtrate and a filter cake comprising insoluble proteins, carbohydrates and calcium phosphate.

2. The process of claim 1 wherein said calcium phosphate precipitate is the sole filter aid used in said filtration step e).

3. The process of claim 1 wherein said liquid suspension of step a) is an aqueous suspension.

4. The process of claim 1 wherein said filtrate product of step e) is contacted with charcoal powder to remove color impurities.

5. The process of claim 1 wherein said protein is a fish protein concentrate.

6. The process of claim 1 wherein said protein is a blood protein mixture.

7. The process of claim 1 wherein said enzyme is pancreatin.

8. The process of claim 1 wherein said enzyme is trypsin.

9. The process of claim 1 wherein said enzyme is chymotrypsin.

10. The process of claim 1 wherein said enzyme is carboxypeptidase A.

11. The process of claim 1 wherein said enzyme is carboxypeptidase B.

12. The process of claim 1 wherein said enzyme is collagenase.

* * * * *

Disclaimer 3,928,630.—*Fulvio Perini*, Palo Alto, Calif. ENZYMATIC PROCESSES FOR HYDROLYZING PROTEINS. Patent dated Dec. 23, 1975. Disclaimer filed Apr. 9, 1976, by the assignee, *Syntex (U.S.A.) Inc.*

Hereby enters this disclaimer to all claims of said patent.

[*Official Gazette June 8, 1976.*]